Patented Apr. 18, 1950

2,504,151

UNITED STATES PATENT OFFICE 2,504,151

PROCESS OF PREPARING METHYL BETA-FURFURYLOXYPROPIONATE

Chessie E. Rehberg, Glenside, and Charles H. Fisher, Abington, Pa., assignors to the United States of America as represented by the Secretary of Agriculture No Drawing. Application February 12, 1948, Serial No. 8,016

1 Claim. (Cl. 260—345)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This application is a continuation in part of our copending application for patent, Serial No. 571,488, filed January 5, 1945, now abandoned.

This invention relates to oxy-esters having the formula $$ROCH_2CH_2COOR'$$

wherein R and R' are alkyl radicals, such as methyl, ethyl, and so forth, or substituted alkyl radicals such as chloropropyl, alkenyl radicals such as allyl, and aralkyl radicals such as benzyl, and to methods for the preparation of such esters.

The object of the invention is to produce new compounds which are useful as solvents, plasticizers, chemical intermediates, and so forth. Other objects and advantages will be apparent from the description of the invention.

It is to be understood that, wherever the term "alkyl" is used herein, it includes "substituted alkyl," and that, wherever the term "alkoxypropionate" is used, it includes "substituted alkyl oxypropionate."

We have discovered that primary and secondary alcohols, under suitable conditions, will react with various acrylic esters in accordance with the following Equation I:

*Equation I*

$$CH_2:CHCOOR + 2R'OH \rightarrow R'OCH_2CH_2COOR' + ROH$$

This reaction comprises two distinct steps: (1) addition of alcohol to the olefinic double bond of the acrylic ester, and (2) alcoholysis of the ester resulting from this previous step. We have discovered further that these steps can be carried out either concurrently or separately. Thus, we can produce the product shown in Equation I either in a single operation, as shown in Equation I, or in two separate operations, as shown in the following Equations II and III:

*Equation II*

$$CH_2:CHCOOR + R'OH \rightarrow R'OCH_2CH_2COOR$$

*Equation III*

$$R'OCH_2CH_2COOR + R''OH \rightarrow R'OCH_2CH_2COOR'' + ROH$$

The reaction represented by Equation I has the advantage of being a one-step process, while on the other hand the two-step process represented by Equations II and III has the advantage of producing a product $R'OCH_2CH_2COOR''$, wherein R' and R'' may be either the same or different, thus making it possible to prepare a much greater variety of products than can be obtained by the one-step process.

The oxy-esters of the invention can also be prepared using the theory of the above equations by reacting an acrylic ester with an ethylene glycol or polyethylene glycol mono-ether, and the resulting product then treated with an ethylene glycol or polyethylene glycol monoalkyl ether to yield a higher oxy-ester.

High yields are obtained in the reactions represented by Equations I and II only when primary or secondary alcohols of relatively low molecular weight are used. The molecular weight of the alcohol, however, is relatively unimportant in the step represented by Equation III.

For the reactions shown in Equations I and II, a strong alkaline catalyst such as an alkali metal alcoholate is suitable, while for the reaction shown in Equation III an esterification catalyst of either the acidic type, such as sulfuric or arylsulfonic acid, or the alkaline type, such as an alkali metal alcoholate, may be used. However, the acidic type in general is preferred.

In general, the reaction in accordance with Equation I utilizes the following procedure:

A low molecular weight acrylic ester, such as methyl acrylate, preferably containing about 2 to 5 percent by weight of an alkaline polymerization inhibitor, such as phenyl-beta-naphthylamine or diphenylamine, is stirred and kept at or below room temperature while there is added slowly 2 to 4 molecular equivalents of an alcohol of higher boiling point than that of the alcohol which will be formed by the reaction, said alcohol being added having dissolved in it about 0.5 to 5.0 parts by weight of sodium for each 100 parts of acrylic ester used. When all of the alcohol has been added, the mixture is slowly warmed and finally refluxed under a fractionating column which is so arranged that the low-boiling alcohol which is liberated in the reaction can be continuously or intermittently distilled from the reaction mixture. Frequently, this low-boiling alcohol will distill as an azeotrope with the acrylic ester used as the reagent. If desired, another material such as a hydrocarbon liquid of suitable boiling point may be added to the reaction mixture to remove the lower-boiling alcohol as a hydrocarbon-alcohol azeotrope. When no more of the alcohol is produced the mixture is cooled, acidified with acetic acid, and distilled. Distillation under reduced pressure is generally preferred so that the crude material is not heated above 100 to 150° C. in the still pot.

The reactions in accordance with Equation III utilize the following procedure:

The oxy-ester is treated with three molecular equivalents of alcohol, using as a catalyst about 2 g. of sulfuric or toluenesulfonic acid. The mixture is then refluxed in a flask fitted with a 3-foot fractionating column, the column having a still-head suitable for operation either under total reflux or with partial take-off. The still is operated under total reflux until the temperature at the still-head drops to the boiling point of the lower-boiling alcohol being produced in the reaction or to the boiling point of the azeotrope containing this alcohol if such an azeotrope is present. The distillate is then slowly collected as long as the lower alcohol continues to be produced. When no more such alcohol is produced, the reaction mixture is fractionally distilled at a pressure such that the still pot is not heated above about 150° C.

The following are examples of the invention, and data including some physical properties of the resulting products are shown in the accompanying table, which in addition lists various other new compounds produced by the above procedures.

Examples 1 and 2 are illustrative of reactions in accordance with Equation I.

Example 1

*Preparation of n-butyl beta-n-butoxypropionate.*—Two moles (172 g.) of methyl acrylate in which are dissolved about 5 g. of phenyl-beta-naphthylamine as an alkaline polymerization inhibitor are stirred and kept below 40° C. while 8.0 moles (592 g.) of n-butanol having 3.0 g. of sodium dissolved in it are slowly added. The mixture is slowly heated to boiling in a flask attached to a 3-foot fractionating column. The column is operated under total reflux until the temperature at the still-head drops to about 62 to 63° C., the boiling point of the methyl acrylate-methanol azeotrope. This azeotrope is then distilled as rapidly as formed until no more methanol is liberated. The reaction mixture is then cooled, acidified with acetic acid, and distilled. The excess alcohol is distilled at about 56° C. and at about 50 mm. pressure. A small amount of methyl beta-butoxypropionate is distilled at about 75° C. and at about 6 mm. pressure, after which the main product, n-butyl beta-n-butoxypropionate, is distilled at about 106° C. and at about 5 mm. pressure.

Example 2

*Preparation of allyl beta-allyloxypropionate.*—By using substantially the same procedure as in Example 1 above, allyl beta-allyloxypropionate is prepared from allyl alcohol and methyl acrylate.

Examples 3 to 8, inclusive, are illustrative of reactions in accordance with Equation II.

Example 3

*Preparation of methyl beta-methoxypropionate.*—Methyl acrylate is stirred and kept below 35° C. while one molecular equivalent of methanol containing 1 g. of sodium for each 100 g. of methyl acrylate is slowly added. The mixture is allowed to stand overnight at room temperature, after which it is acidified with acetic acid and distilled. In similar preparations, excellent yields are obtained by refluxing the reaction mixture for about 0.5 to 2.0 hours instead of allowing the mixture to stand overnight. When the reaction mixture is to be heated, it is advisable to add a polymerization inhibitor, such as an aryl amine, to the reaction mixture.

Example 4

*Preparation of methyl beta - ethoxypropionate.*—Using substantially the same procedure as in Example 3 above, methyl acrylate is treated with ethanol to produce methyl beta-ethoxypropionate.

Example 5

*Preparation of methyl beta-n-butoxypropionate.*—By proceeding substantially as in Example 3 above, methyl acrylate is treated with n-butanol to produce methyl beta-n-butoxypropionate. The yield is substantially unchanged by either allowing the reaction mixture to stand at room temperature for only about 3 to 4 hours before distilling, or refluxing the mixture for 8 hours after it has stood overnight at room temperature and then distilling.

Example 6

*Preparation of methyl beta-sec.-butoxypropionate.*—One mole of sec.-butanol, three moles of methyl acrylate, 1 g. of sodium and about 5 g. of phenyl-beta-naphthylamine are mixed as in Example 3 above, and then refluxed for about 1 hour. After acidification with acetic acid the mixture is distilled.

Example 7

*Preparation of ethyl beta-ethoxypropionate.*—By proceeding substantially as in Example 3 above, ethyl acrylate is treated with ethanol containing sodium ethoxide. The mixture is allowed to stand overnight before being distilled.

Example 8

*Preparation of isobutyl beta-methoxypropionate.*—By proceeding substantially as in Example 3 above, isobutyl acrylate is treated with methanol and sodium methoxide. The mixture is kept below 40° C. and allowed to stand overnight before being acidified and distilled.

Examples 9 to 11, inclusive, are illustrative of reactions in accordance with Equation III.

Example 9

*Preparation of 2-ethylbutyl beta-methoxypropionate.*—One mole of methyl beta-methoxypropionate is treated with three moles of 2-ethylbutanol and 1.5 cc. of sulfuric acid. After refluxing for about 12 hours with slow distillation of methanol, the mixture is fractionally distilled.

Example 10

*Preparation of sec.-butyl beta-methoxypropionate.*—Using substantially the same procedure as in Example 9 above, methyl beta-methoxypropionate is treated with sec.-butanol, using toluenesulfonic acid as a catalyst.

Example 11

*Preparation of beta-ethoxyethyl beta-methoxypropionate.*—Methyl beta-methoxypropionate is treated with beta-ethoxyethanol, the catalyst being toluenesulfonic acid.

The following table lists some oxy-esters produced by our invention and some of their physical properties. R and R', which may be alkyl or substituted alkyl, alkenyl, and aralkyl radicals, are those radicals applicable to the general formula

ROCH₂CH₂COOR'

| Example | R | R' | Properties | | | | Per Cent Yield |
|---|---|---|---|---|---|---|---|
| | | | Boiling Point | | Refractive Index $N_d^{20}$ | Density $D_4^{20}$ | |
| | | | Temp. in °C. | Pressure in mm. | | | |
| 1 | n-butyl | n-butyl | 100–106 | 5 | 1.4223 | 0.9104 | 60 |
| 2 | allyl | allyl | 82 | 6 | 1.4429 | 0.9735 | 33 |
| 3 | methyl | methyl | 66–70 | 50 | 1.4040 | 1.0088 | 91 |
| 4 | ethyl | do | 69 | 19 | 1.4050 | 0.9721 | 91 |
| 5 | butyl | do | 75 | 6 | 1.4153 | 0.9417 | 63 |
| 6 | s-butyl | do | 73 | 15 | 1.4112 | 0.9384 | 27 |
| 7 | ethyl | ethyl | 163–167 | 760 | 1.4070 | 0.9490 | 84 |
| 8 | methyl | i-butyl | 86–92 | 28 | 1.4126 | 0.9361 | 44 |
| 9 | do | 2-ethyl-butyl | 83–84.5 | 3 | 1.4242 | 0.9294 | 89 |
| 10 | do | s-butyl | 76–78 | 17 | 1.4104 | 0.9343 | 86 |
| 11 | do | beta-ethoxyethyl | 91.5 | 6 | 1.4224 | 1.0097 | 83 |
| 12 | do | ethyl | 59–62 | 21 | 1.4049 | 0.9754 | 27 |
| 13 | do | n-propyl | 103 | 100 | 1.4113 | 0.9559 | 41 |
| 14 | do | n-butyl | 76 | 8 | 1.4150 | 0.9411 | 88 |
| 15 | do | n-amyl | 89–93 | 10 | 1.4191 | 0.9335 | 94 |
| 16 | do | i-amyl | 84–85 | 9 | 1.4179 | 0.9295 | 87 |
| 17 | do | gamma-chloropropyl | 117–119 | 19 | 1.4421 | 1.1184 | 75 |
| 18 | do | allyl | 75.5 | 17 | 1.4260 | 0.9884 | 82 |
| 19 | do | benzyl | 119 | 3 | 1.4993 | | 35 |
| 20 | n-hexyl | methyl | 113–118 | 20 | 1.4227 | 0.9247 | 38 |
| 21 | beta-chloro-ethyl | beta-chloro-ethyl | 99–100 | <1 | 1.4633 | 1.2865 | 27 |
| 22 | gamma-chloropropyl | gamma-chloropropyl | 130–136 | <1 | 1.4589 | 1.1640 | 39 |

*Example 23*

*Preparation of methyl beta-furfuryloxypropionate.*—Methyl acrylate is stirred and kept below 35° C. while there is slowly added one molecular equivalent of furfuryl alcohol in which has been dissolved about 1 g. of sodium per 100 g. of alcohol. After the addition is complete, the mixture is allowed to stand at room temperature for about from 12 to 24 hours. It is then acidified with acetic acid and distilled in vacuum. After removal of unreacted materials the product, methyl beta-furfuryloxypropionate, is distilled at 127° C. (12 mm. pressure). A 30% yield was obtained. The product is a colorless, mobile liquid, $N_d^{20}=1.4693$ and $D_4^{20}=1.1278$ Furfuryl alcohol may also be added to other acrylic esters, such as ethyl, butyl, octyl, beta-ethoxyethyl, beta-butoxyethyl, tetrahydrofurfuryl, allyl, benzyl, and beta-chloroethyl acrylates, to produce the corresponding oxy-esters.

From these examples and the foregoing discussion, it is evident that a very wide variety of oxy-esters can be made in accordance with our invention. In general, the reactions represented by Equations I and II give high yields of the desired products only when the alcohol used as the other reagent is one of relatively low molecular weight. For this reason, we prefer to prepare oxy-esters of the higher alcohols by alcoholysis of the ester of a lower alcohol in accordance with Equation III.

The esters prepared in accordance with this invention are clear, colorless liquids of relatively low vapor pressure and are useful as solvents, plasticizers, chemical intermediates, or resin intermediates. These esters are compatible with cellulosic derivatives such as ethyl cellulose and are useful as plasticizers for such derivatives. Thus, when equal weights of ethyl cellulose and one of the following esters are dissolved in acetone, it is found that all of the mixtures are compatible, and when the solvent is allowed to evaporate and the resulting films are cured for 24 hours at 85° C., the films finally obtained exhibit the following characteristics:

| Plasticizer | Plastic |
|---|---|
| isoamyl beta-methoxypropionate | clear, tough, flexible. |
| ethoxyethyl beta-methoxypropionate | Do. |
| gamma chloropropyl beta-methoxypropionate | clear, brittle. |
| ethyl beta-ethoxypropionate | Do. |
| n-butyl beta-n-butoxypropionate | clear, tough, flexible. |
| methyl beta-furfuryloxypropionate | brown, brittle. |

The films plasticized with isoamyl beta-methoxypropionate and n-butyl beta-n-butoxypropionate are clear, colorless, flexible, and tough, resembling Celluloid in physical characteristics.

Having thus described our invention, what we claim is:

A process of preparing methyl beta-furfuryloxypropionate comprising mixing methyl acrylate with about a molecular equivalent of furfuryl alcohol having dissolved therein about 1 part, by weight, of sodium for each 100 parts of methyl acrylate, at a temperature below about 35° C., and then isolating the formed methyl beta-furfuryloxypropionate.

CHESSIE E. REHBERG.
CHARLES H. FISHER.

REFERENCES CITED

The following references are of record in the file of this patent:

UNITED STATES PATENTS

| Number | Name | Date |
|---|---|---|
| 2,196,747 | Dickey et al. | Apr. 9, 1940 |
| 2,196,750 | Dickey et al. | Apr. 9, 1940 |
| 2,433,866 | Rehberg et al. | Jan. 6, 1948 |

OTHER REFERENCES

Koelsch, Jr. of Am. Chem. Soc., vol. 65, page 438.